Oct. 15, 1935.   F. H. SODEN   2,017,262

DEVICE FOR SECURING AN EYEGLASS LENS TO A SUPPORT

Filed Oct. 15, 1934

INVENTOR
Fred H. Soden
Harold E. Stonebraker
ATTORNEY

Patented Oct. 15, 1935

2,017,262

UNITED STATES PATENT OFFICE 2,017,262

DEVICE FOR SECURING AN EYEGLASS LENS TO A SUPPORT

Fred H. Soden, Rochester, N. Y., assignor to Continental Optical Company, Inc., Rochester, N. Y., a corporation of Indiana Application October 15, 1934, Serial No. 748,325

3 Claims. (Cl. 88—47)

This invention relates to a device for securing an eyeglass lens to a support, with reference more particularly to the rimless type of eyeglasses in which the lens is attached at its ends to an end piece and center respectively, and has for its object to afford a simple and practical construction that enables quickly and efficiently soldering together the parts which hold the lens in place.

A more specific purpose of the invention is to afford a device that can be furnished to the optician ready for use, and includes a pin provided with or carrying a solder element and adapted to pass through the openings in the lens and lens support or strap, the solder unit being mounted in such a way that when assembled and melted, it acts to unit the pin to the support and secure these parts together rigidly so as to hold the lens permanently in proper position.

Another object of the invention is to afford a pin construction which the operator can readily insert into the arms of the lens support and lens, insuring locating the solder unit in proper position readily and accurately, and which, when the solder is melted and the pin is forced through the support, acts to press the solder into the desired position to effect a firm, solid union between the pin and the support.

To these and other ends, the invention consists in the construction and arrangement of parts that will appear clearly from the following description when read in conjunction with the accompanying drawing, the novel features being pointed out in the claims following the description.

In the drawing, in which the parts are shown several times their actual size:

Figure 1:
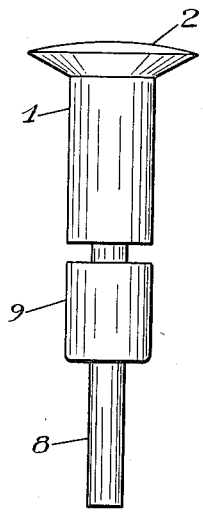
Fig. 1 is a side elevation of a preferred embodiment of the device constituting the invention, and consisting of a pin with a solder unit carried by the pin and preferably mounted thereon.

Referring more particularly to the drawing, in which like reference characters refer to the same parts throughout the several views, the device includes a pin comprising preferably an enlarged body portion 1 and a head 2, the latter being adapted to engage a seat or depression 3 in the upper arm 4 of a conventional lens support or strap, which also includes a lower arm 5 having an opening 6 which may be threaded or otherwise formed on its interior surface, while 7 designates the lens to be secured between the upper and lower arms of the support.

Extending beneath the enlarged body portion 1 of the pin is a reduced end portion 8, preferably formed integral with the body portion 1, and mounted upon said reduced end portion 8 is a sleeve 9 of suitable solder, the outer diameter of which may be approximately the same as that of the body portion 1. The sleeve 9 has an opening therethrough that permits it to slide over the reduced end portion 8, and at one end the opening through the sleeve is slightly reduced by crowding or squeezing the sleeve inwardly as indicated at 10 to afford a close frictional engagement with the reduced portion 8 of the pin, sufficiently to prevent the sleeve from sliding freely on the pin while at the same time it can be readily moved along the pin by the operator.

Figure 2:
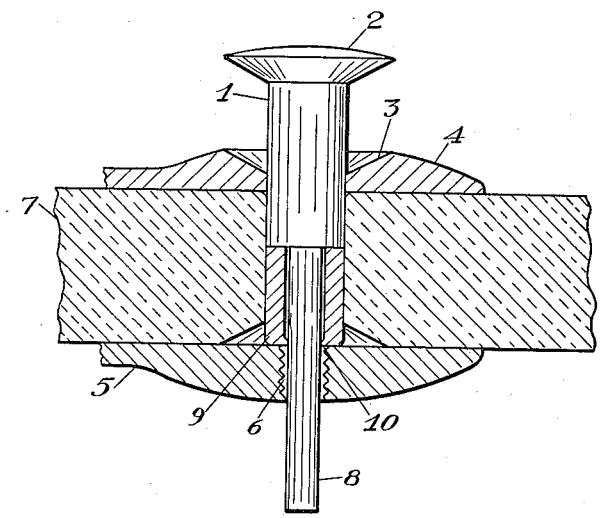
Fig. 2 is a sectional view of a lens and lens support, with parts broken away, showing the position of the pin and solder unit when initially inserted into the lens and support.

The device is preferably furnished to the optician in the form shown in Fig. 1 with the solder sleeve 9 mounted on the reduced end portion 8, and in securing a lens, the latter is first placed within the support or strap with the lens opening coinciding with the openings in the arms of the strap, and the pin, with the solder sleeve thereon, is inserted in the manner shown in Fig. 2, and pushed downwardly until the bottom end of the solder sleeve abuts the inner surface of the arm 5 and the upper end of the solder sleeve abuts the shoulder formed by the inner end of the body portion 1 of the pin, as shown in Fig. 2.

Thereupon pressure is applied by a suitable machine, solder pliers, or other instrumentality, to the upper end of the pin and to the bottom of the arm 5, forcing these parts toward each other and at the same time heat is applied to melt the solder sleeve 9. As this action takes place, the body portion 1 of the pin forces the solder downwardly into the opening 6 of the arm 5 around the reduced portion 8 of the pin and also between the inner surface of the arm 5 and the inner end of the body or enlarged portion 1 of the pin, as shown in Fig. 3.

Figure 3:
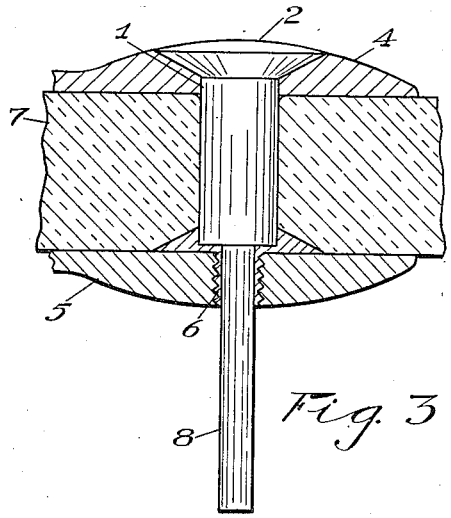
Fig. 3 is a similar sectional view showing the position of the pin and solder after the latter has been melted and the pin forced to the limit of its movement.
Figure 4:
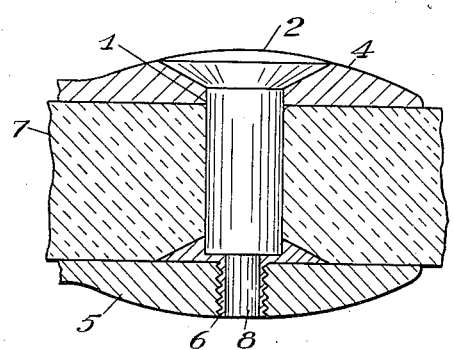
Fig. 4 is a sectional view of the completed lens assembly.

The protruding end of the pin shown in Fig. 3 is then cut off by any suitable instrument, leaving the finished lens assembly as shown in Fig. 4, from which it will be seen there is a rigid and permanent soldered connection between the reduced portion 8 of the pin and the arm 5, and also between the inner surface of the arm 5 and the enlarged body portion 1 of the pin, the solder surrounding the inner end of the latter. Thus the pin is tightly secured to the support so that accidental or unintentional loosening is prevented and the lens cannot be removed except by reheating the solder.

Where the term "solder" is used throughout the specification and claims, it is to be understood as comprehending any metallic solder or other fusible or meltable cementitious or binding substance capable of uniting two metallic surfaces when fused.

While the invention has been described with reference to a particular construction, it is not confined to the details shown and described, and this application is intended to cover any departures or modifications coming within the purposes of the improvement or the scope of the following claims.

I claim:

1. A device for securing an eyeglass lens to a support by soldering a pin to the support, comprising a pin including a cylindrical body portion adapted to pass through and closely fit a corresponding cylindrical opening in a lens, an end portion of less diameter than said body portion adapted to extend through an opening in one arm of the support, the end of the body portion affording a shoulder surrounding said end portion, and a sleeve of solder slidable endwise on said reduced end portion and having an exterior surface of no greater diameter than said body portion, one end of said solder sleeve being engageable by endwise movement against said shoulder formed by the end of the body portion of the pin.

2. A device for securing an eyeglass lens to a support, comprising a pin including a cylindrical body portion adapted to engage the lens opening, an end portion of less diameter than said body portion adapted to extend through an opening in one arm of the support, a sleeve of solder slidable on said reduced end portion and engageable against one end of said body portion, and means for preventing free movement of the sleeve on the pin, said sleeve having an exterior surface of no greater diameter than said body portion.

3. A device for securing an eyeglass lens to a support, comprising a pin including a cylindrical body portion adapted to fit closely in the lens opening, an end portion of less diameter than said body portion adapted to extend through an opening in one arm of the support, and a sleeve of solder slidable on said reduced end portion and engageable against one end of said body portion, the opening in the sleeve at one end being reduced to afford a frictional engagement with the pin and prevent free movement of the sleeve on the pin, said sleeve having an exterior surface of no greater diameter than said body portion.

FRED H. SODEN.